Feb. 28, 1956          G. L. MARCUS          2,736,225
BASS VIOL CART
Filed April 1, 1952
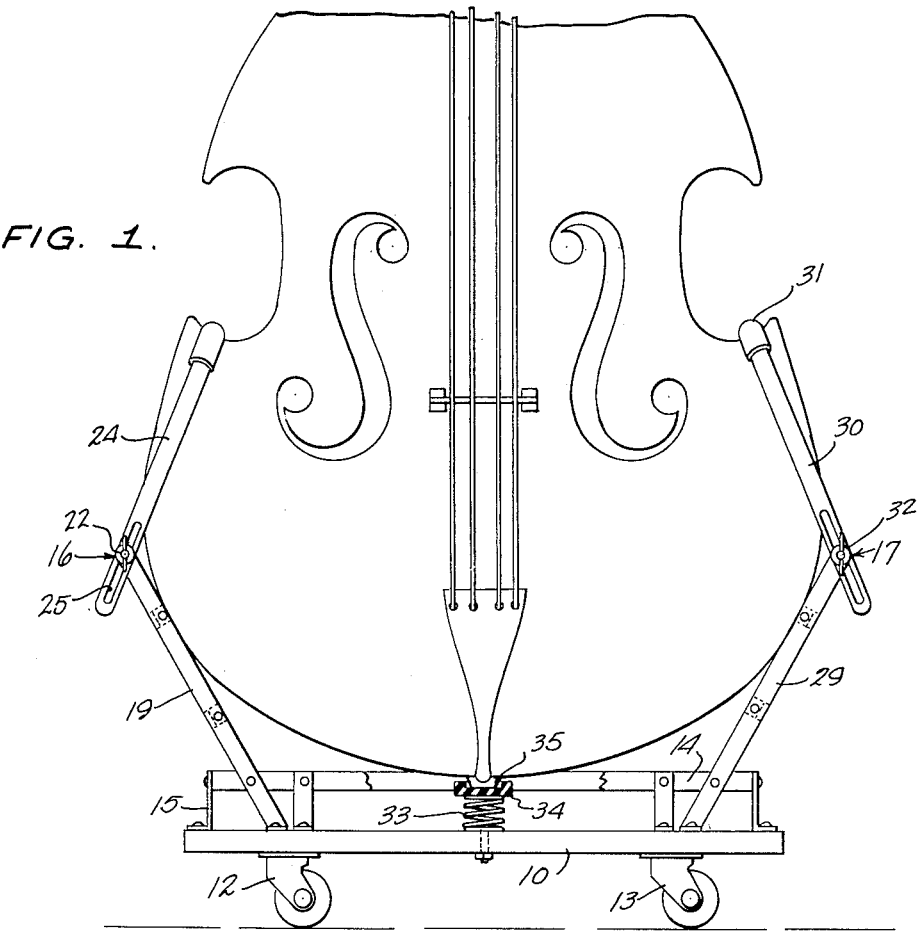
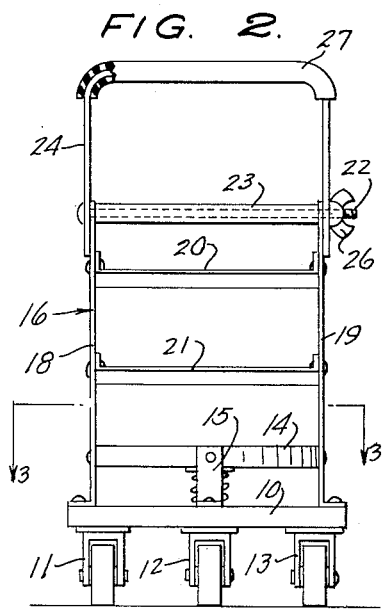
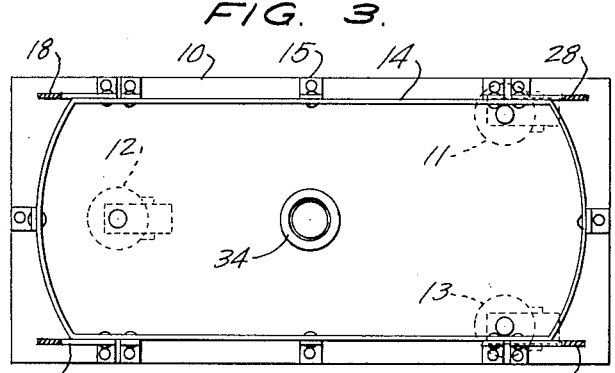
INVENTOR.
GEORGE L. MARCUS,
BY
McMorrow, Berman & Davidson
ATTORNEYS.

United States Patent Office 2,736,225
Patented Feb. 28, 1956

2,736,225

BASS VIOL CART

George L. Marcus, Brooklyn, N. Y.

Application April 1, 1952, Serial No. 279,880

5 Claims. (Cl. 84—280)

This invention relates to hand carts and more particularly to a cart for supporting a bass viol or double bass musical instrument.

It is among the objects of the invention to provide an improved hand cart for a bass viol which cart is firmly attached to the instrument and provides instrument supporting caster wheels so that the instrument can be rolled along flat surfaces, such as floors and sidewalks, and the cart and instrument can be picked up together, when necessary, as when curbs or steps are encountered; which will support the instrument in upright position when the instrument is released; which has a resilient connection with the instrument so that the instrument will not be subjected to shock or damage; and which is simple and durable in construction, economical to manufacture, and neat and attractive in appearance.

Other objects and advantages will become apparent from a consideration of the following description and the appended claims in conjunction with the accompanying drawing wherein:

Figure 1 is a front elevational view of a bass viol supporting cart illustrative of the invention with a bass viol secured therein, a portion being broken away and shown in cross section to better illustrate the construction thereof;

Figure 2 is a side elevational view of the cart illustrated in Figure 1, a portion being broken away and shown in cross section; and Figure 3 is a cross sectional view on the line 3—3 of Figure 2.

With continued reference to the drawing, the bass viol cart comprises a base plate 10 of elongated, rectangular shape, three caster wheels, as designated at 11, 12 and 13, secured to one side of the base plate for supporting the base plate on a horizontal surface, and a bass viol engaging frame secured to the other side of the base plate.

The wheel 12 is mounted on the base plate near one end and substantially at the mid-width location of the plate and the wheels 11 and 13 are mounted on the plate near the other end and one adjacent each side edge of the plate, so that the three wheels provide a tripod type support for the cart.

The frame comprises a rail 14, preferably in the form of a metal strap of elongated, rectangular cross sectional shape extending along the side and end edges of the plate substantially parallel to and spaced from the plate and supported on the plate by spaced apart legs or angle brackets 15 and further includes a pair of instrument engaging structures, generally indicated at 16 and 17, disposed one near each end of the plate and projecting from the side of the plate remote from the caster wheels.

As the two end structures are substantially identical in construction, a detailed illustration and description of one only is considered sufficient for the purposes of the present disclosure, the end structure 16 having been selected for such detailed illustration and description.

As is particularly illustrated in Figures 1 and 2, the end structure 16 comprises two standards 18 and 19 disposed in spaced apart and substantially parallel relationship to each other and each connected at one end to the plate 10 in a manner such that the end structure is disposed transversely of the plate at a location spaced from the adjacent end of the latter. These standards 18 and 19 are inclined upwardly and outwardly away from the mid-length location of the plate and are held in their spaced apart and substantially parallel relationship to each other by brace bars 20 and 21 which extend between the standards and are secured at their ends thereto. The brace bar 20 is disposed near the ends of the standards remote from the base plate 10 and substantially perpendicular to both standards, while the brace bar 21 is disposed between the upper brace bar 20 and the end portion of the rail 14 and is also substantially perpendicular to both of the standards. It will be noted that the standards are secured to the rail 14 as well as to the base plate 10, so that they are rigidly supported in their upwardly inclined positions relative to the base plate.

At their ends remote from the base plate 10 the standards 18 and 19 are provided with apertures receiving a bolt 22 and this bolt extends through a spacer sleeve 23 disposed between the standards at the upper ends thereof.

A U-shaped bail 24 has the end of one of its legs at the open end of the bail disposed at the outer side of the upper end portion of the standard 18, and the corresponding end of its other leg disposed at the outer side of the upper end portion of the other standard 19. At the open end of the bail the legs are provided with elongated slots, as indicated at 25 in Figure 1, extending longitudinally thereof, which slots receive the bolt 22 to pivotally and adjustably connect the bail to the standards. The bolt has a head at one end bearing against one of the legs and a wing nut 26 is threaded onto the other end of the bolt to clamp the bail in selected positions of adjustment relative to the standards 18 and 19. A tubular cushion 27 of a suitable resilient material, such as soft rubber, receives the bight portion of the bail 24 for a purpose to be presently described.

The end structure 17 has corresponding standards 28 and 29, a bail 30 corresponding to the bail 24, and having a tubular pad 31 thereon, and a bolt 32 pivotally and adjustably connecting the bail to the standards 28 and 29 at the upper ends of these standards.

A compression spring 33 is mounted on the base plate 10 substantially at the center of the side of the base plate remote from the caster wheels and a flat socket 34 is carried on the end of the spring 33 remote from the base plate.

In order to mount the bass viol on the cart, the stick projecting from the bottom of the bass viol is removed and the stick receiving boss 35 on the bottom of the bass viol is placed in the socket 34. The bails 24 and 30 are then moved inwardly until the padded bight portions thereof are received in the bow recesses disposed one at each side of the bass viol and, with the nuts on the bolts 22 and 32 loosened, the bails are pushed down until the padded portions thereof firmly engage the bass viol at the bottom sides of the corresponding bow recesses slightly compressing the spring 33. The nuts are then tightened and the bass viol is firmly secured in position on the cart.

The bass viol and the cart may now be moved along a flat surface, such as a floor or sidewalk, by grasping the neck of the bass viol and tilting the bass viol and the cart so that only the caster wheels 11 and 13 are in contact with the supporting surface. The instrument with the attached cart may now be pulled along the flat supporting surface and when it becomes necessary to lift the instrument, as when a curb or steps are encountered, the instrument and cart will both be lifted by raising the neck of the instrument. When the neck of the instrument is released, the third caster wheel 12 will come into contact with the supporting surface and the three wheels will support the instrument in upright position.

The standards, the brace bars, the bails and the rail and supporting legs are all preferably formed of lightweight, flat metal stock, so that the cart, while strong and rigid, has very little weight and can be easily carried along with the instrument. The spring 33 and the resilient pads 27 and 31 protect the instrument from damage or shock while supported on the cart.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A bass viol cart comprising a base plate, caster wheels secured to said base plate and extending from one side thereof in spaced apart relationship to each other, end structures secured to said base plate one near each end thereof and projecting from the other side of said base plate in divergent relationship to each other, each of said end structures comprising a first portion secured at one end to said base plate and a bail pivotally secured at its open end to said first portion at the other end of the latter, a compression spring mounted on said base plate at the center of the side thereof remote from said caster wheels, and a socket carried by said spring in spaced relationship to said base plate, said socket being adapted to receive the bottom end boss on a bass viol and said bails being adapted to hook into the bow recesses thereof.

2. A bass viol cart comprising a base plate, caster wheels secured to said base plate and extending from one side thereof in spaced apart relationship to each other, end structures secured to said base plate one near each end thereof and projecting from the other side of said base plate in divergent relationship to each other, each of said end structures comprising a first portion secured at one end to said base plate and a bail pivotally secured at its open end to said first portion at the other end of the latter, a compression spring mounted on said base plate at the center of the side thereof remote from said caster wheels, and a socket carried by said spring in spaced relationship to said base plate, said socket being adapted to receive the bottom end boss on a bass viol and said bails being adapted to hook into the bow recesses thereof, said caster wheels being disposed one near one end and adjacent the mid-width location of said base plate and two near the other end of said base plate and near respectively opposite sides thereof.

3. A bass viol cart comprising a base plate, caster wheels secured to said base plate and extending from one side thereof in spaced apart relationship to each other, end structures secured to said base plate one near each end thereof and projecting from the other side of said base plate in divergent relationship to each other, each of said end structures comprising a first portion secured at one end to said base plate and a bail pivotally secured at its open end to said first portion at the other end of the latter, a compression spring mounted on said base plate at the center of the side thereof remote from said caster wheels, and a socket carried by said spring in spaced relationship to said base plate, said socket being adapted to receive the bottom end boss on a bass viol and said bails being adapted to hook into the bow recesses thereof, each of said bails having a tubular cushion of resilient material on its intermediate portion and having elongated slots disposed one in each leg near the open end of the bail for adjustably connecting the bail to the substantially rigid portion of the corresponding end structure.

4. A bass viol cart comprising a base plate, caster wheels secured to said base plate and extending from one side thereof in spaced apart relationship to each other, end structures secured to said base plate one near each end thereof and projecting from the other side of said base plate in divergent relationship to each other, each of said end structures comprising a first portion secured at one end to said base plate and a bail pivotally secured at its open end to said first portion at the other end of the latter, a compression spring mounted on said base plate at the center of the side thereof remote from said caster wheels, a socket carried by said spring in spaced relationship to said base plate, said socket being adapted to receive the bottom end boss on a bass viol and said bails being adapted to hook into the bow recesses thereof, a rail extending along the edges of said base plate in spaced and substantially parallel relationship to the side of said base plate remote from said wheels, and angle brackets supporting said rails from said base plate.

5. A support for a bass viol comprising a horizontal base plate having means to facilitate movement thereof over a supporting surface, means centered on the base plate exerting a continuous, yielding pressure upwardly from the base plate in a vertical direction, and adapted as a rest for the lower end of a supported bass viol, upstanding standards rigid at their lower ends with the base plate adjacent the ends of the base plate, the lower ends of the standards being spaced from the rest means at opposite sides thereof for accommodation of the lower end of a supported viol between the standards, and bails of inverted U-shape carried by and extending upwardly from the upper ends of the standards, the bails having bights at their upper ends adapted to engage in the bow recesses of a viol supported on the rest means and having depending legs connected to the standards, the connections of the legs to the standards being adapted for holding the bails against upward movement relative to the standards, base plate, and rest means, whereby to hold a supported viol against the rest means in opposition to the upward pressure exerted by the rest means.

References Cited in the file of this patent

UNITED STATES PATENTS

| 284,473 | Parker | Sept. 4, 1883 |
| 905,050 | Birch | Nov. 24, 1908 |
| 1,290,159 | Foster | Jan. 7, 1919 |
| 1,722,585 | Manley | July 30, 1929 |
| 1,735,505 | Marchev | Nov. 12, 1929 |
| 2,502,229 | Miller | Mar. 28, 1950 |
| 2,510,799 | Carley | June 6, 1950 |
| 2,549,489 | Krause | Apr. 17, 1951 |
| 2,588,830 | Haanstad | Mar. 11, 1952 |
| 2,627,425 | McNamara | Feb. 3, 1953 |

FOREIGN PATENTS

| 318,931 | France | Feb. 21, 1902 |
| 21,028 | Denmark | Feb. 21, 1916 |
| 344,945 | Great Britain | Mar. 16, 1931 |